(12) United States Patent
Anhut et al.

(10) Patent No.: US 11,221,472 B2
(45) Date of Patent: Jan. 11, 2022

(54) OPTICAL GROUP FOR DETECTION LIGHT FOR A MICROSCOPE, METHOD FOR MICROSCOPY, AND MICROSCOPE

(71) Applicant: Carl Zeiss Microscopy GmbH, Jena (DE)

(72) Inventors: Tiemo Anhut, Jena (DE); Matthias Wald, Jena (DE); Daniel Schwedt, Weimar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/342,604

(22) PCT Filed: Oct. 16, 2017

(86) PCT No.: PCT/EP2017/076334
§ 371 (c)(1),
(2) Date: Apr. 17, 2019

(87) PCT Pub. No.: WO2018/073169
PCT Pub. Date: Apr. 26, 2018

(65) Prior Publication Data
US 2019/0258041 A1   Aug. 22, 2019

(30) Foreign Application Priority Data
Oct. 17, 2016   (DE) .......................... 10 2016 119 730

(51) Int. Cl.
*G02B 21/00* (2006.01)
*G01N 21/64* (2006.01)

(52) U.S. Cl.
CPC ......... *G02B 21/0064* (2013.01); *G01N 21/64* (2013.01); *G02B 21/008* (2013.01);
(Continued)

(58) Field of Classification Search
CPC . G02B 21/0064; G02B 21/0024; G01N 21/64
See application file for complete search history.

(56) References Cited

U.S. PATENT DOCUMENTS

| 5,932,871 A | 8/1999 | Nakagawa et al. |
| 6,525,812 B1 | 2/2003 | Hartmann et al. |

(Continued)

FOREIGN PATENT DOCUMENTS

| CN | 1229927 A | 9/1999 |
| CN | 101031837 A | 9/2007 |

(Continued)

OTHER PUBLICATIONS

International Search Report and Written Opinion for International Application No. PCT/EP2017/076334 (No English Translation available), dated Mar. 29, 2018, 14 pages.

(Continued)

*Primary Examiner* — Edwin C Gunberg
(74) *Attorney, Agent, or Firm* — LaBatt, LLC

(57) ABSTRACT

The invention relates to an optical group for detection light of a microscope, in particular a confocal scanning microscope, having an input plane (10) for the passage of detection light to be measured and having a detection beam path arranged downstream of the input plane for guiding the detection light (11) into a detection plane (67), wherein the detection beam path has at least one first beam course (1) having first optical beam-guiding means, in particular first lenses and/or mirrors (20, 30, 34, 36, 58, 60, 66), for guiding the detection light into the detection plane. In the first beam course, the optical group has at least one dispersive device (26) for the spatial spectral splitting of the detection light to be measured and a manipulation device (49) for manipulating the spectrally spatially split detection light. The first optical beam-guiding means together with the dispersive device and with the manipulation device are arranged and (Continued)

Figure 1:
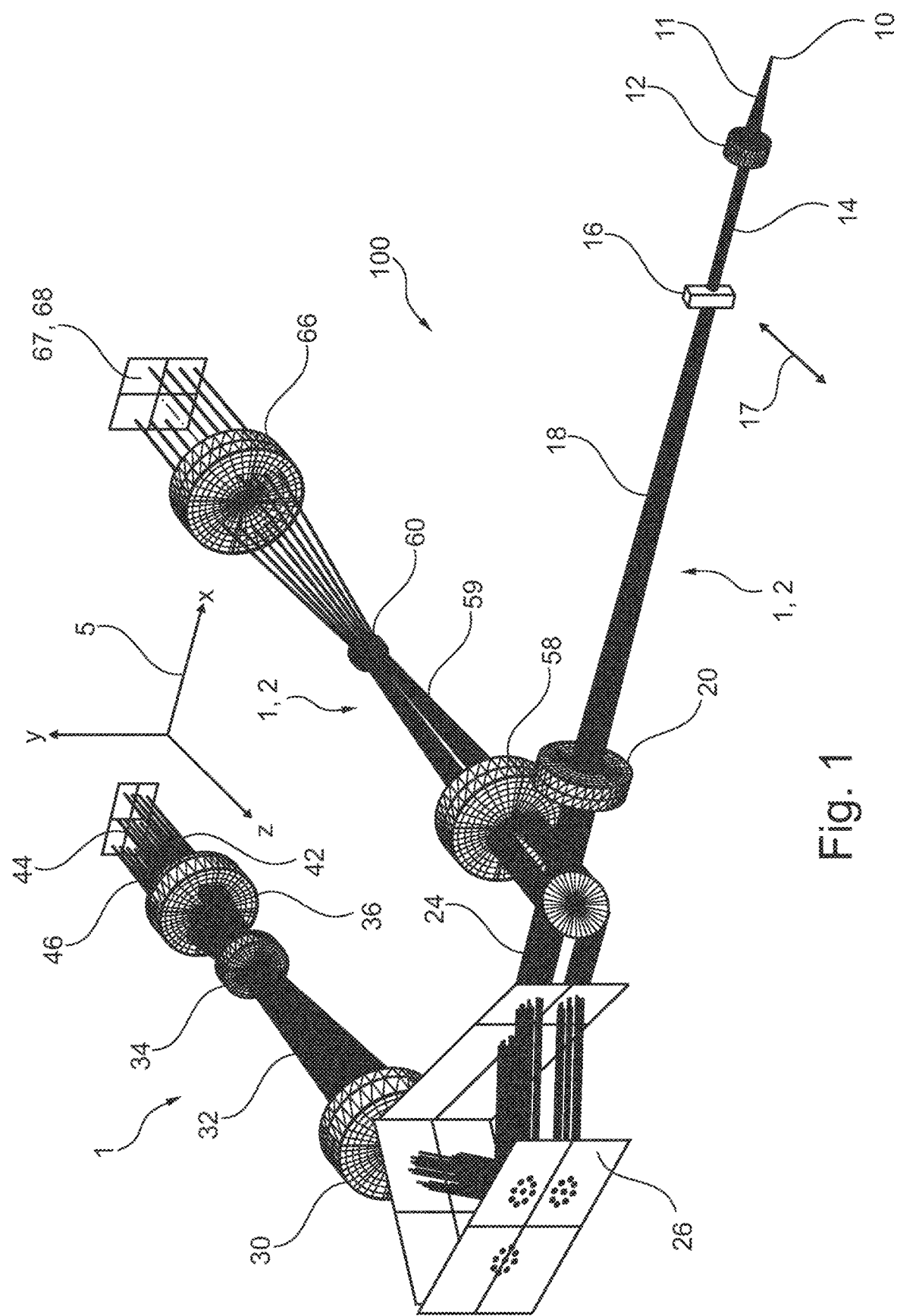

designed to produce a spectrally separated and diffraction-limited image of the Input plane into the detection plane. The optical group preferably has a second beam course (2) having optical beam-guiding means and has a selection device (22) for selecting the first beam course (1) or the second beam course (2). In further aspects, the invention relates to a method for microscopy and to a microscope.

29 Claims, 6 Drawing Sheets

(52) U.S. Cl.
CPC ..... *G02B 21/0024* (2013.01); *G02B 21/0032* (2013.01); *G02B 21/0076* (2013.01); *G01N 2201/0638* (2013.01)

(56) References Cited

U.S. PATENT DOCUMENTS

| | | | |
|---|---|---|---|
| 7,335,898 | B2 | 2/2008 | Donders et al. |
| 8,284,484 | B2 | 10/2012 | Hoult et al. |
| 9,389,120 | B2 | 7/2016 | Konradi et al. |
| 9,762,983 | B2 | 9/2017 | Zhao et al. |
| 9,989,746 | B2 | 6/2018 | Bathe et al. |
| 10,078,216 | B2 | 9/2018 | Plotkin et al. |
| 10,108,008 | B2 | 10/2018 | Fukuyama |
| 10,203,490 | B2 | 2/2019 | Schwedt et al. |
| 10,261,300 | B2 | 4/2019 | Lippert et al. |
| 2002/0024007 | A1 | 2/2002 | Engelhardt et al. |
| 2003/0160250 | A1* | 8/2003 | Cova ............... H01L 27/14643 257/80 |
| 2005/0094233 | A1 | 5/2005 | Tomioka |
| 2006/0072191 | A1* | 4/2006 | Akiyama ........... G02B 21/0032 359/385 |
| 2006/0152787 | A1 | 7/2006 | Knebel et al. |
| 2007/0223076 | A1* | 9/2007 | Knebel ............. G02B 21/0032 359/209.1 |
| 2012/0218547 | A1 | 8/2012 | Konradi et al. |
| 2013/0012794 | A1* | 1/2013 | Zeng ................... A61B 1/0676 600/328 |
| 2015/0145981 | A1 | 5/2015 | Anhut et al. |
| 2015/0185454 | A1 | 7/2015 | Kalkbrenner et al. |
| 2015/0192461 | A1 | 7/2015 | Chen |
| 2017/0199362 | A1 | 7/2017 | Schwedt et al. |
| 2017/0350763 | A1 | 12/2017 | Shafer et al. |

FOREIGN PATENT DOCUMENTS

| | | | |
|---|---|---|---|
| CN | 101595414 | A | 12/2009 |
| CN | 101869466 | A | 10/2010 |
| CN | 103620506 | A | 3/2014 |
| CN | 104303089 | A | 1/2015 |
| CN | 104541193 | A | 4/2015 |
| CN | 104620155 | A | 5/2015 |
| CN | 104956249 | A | 9/2015 |
| CN | 105103028 | A | 11/2015 |
| DE | 19944355 | A1 | 3/2001 |
| DE | 10332193 | A1 | 2/2005 |
| DE | 102009043745 | A1 | 4/2011 |
| DE | 102012203736 | A1 | 9/2013 |
| DE | 102013015931 | A1 | 3/2015 |
| DE | 102014107606 | A1 | 3/2015 |
| DE | 102014107606 | A1 | 12/2015 |
| EP | 2703871 | A2 | 5/2014 |
| JP | 2006510926 | A | 3/2006 |
| WO | WO-9845744 | A2 * | 10/1998 ............. G02B 21/16 |
| WO | 03093892 | A1 | 11/2003 |
| WO | 2006008304 | A1 | 1/2006 |
| WO | 2012093719 | A1 | 7/2012 |
| WO | 2016078925 | A1 | 5/2016 |

OTHER PUBLICATIONS

International Preliminary Report on Patentability for International Application No. PCT/EP2017/076334, (With English Translation) dated Apr. 23, 2019, 21 pages.

German Application No. DE201610119730 20161017, Search Report and Written Opinion (English Translation not Available), dated May 24, 2017, 12 pages.

Knapczyk, M., et al., Reconfigurable Optical Filter Based on Digital Mirror Arrays, IEEE Photonics Technology Letters, vol. 17, No. 8, Aug. 2005, pp. 1743-1745.

Fenzl, Birgit, European Examination Report for EP Application No. 17788183.6, dated Oct. 21, 2020, 7 pages. (with English translation of remarks on pp. 4-7).

Yang, Jing and Yi Han, Chinese Application No. 201780063949.8, First Office Action (with English translation), dated Mar. 10, 2021, 23 pages.

Moriuchi, Masaaki, Japanese Patent Application No. 2019-541873, Office Action (with English translation), dated Oct. 13, 2021, 22 pages.

Office Action (with English translation), Chinese Patent Application No. 201780063949.8, dated Oct. 26, 2021, 6 pages.

\* cited by examiner

OPTICAL GROUP FOR DETECTION LIGHT FOR A MICROSCOPE, METHOD FOR MICROSCOPY, AND MICROSCOPE

The present invention relates, in a first aspect, to an optical group for detection light for au microscope according to the preamble of claim 1, in particular for a confocal scanning microscope.

In further aspects, the invention relates to a method for microscopy, in particular using the optical group according to the invention, and to a microscope, in particular a confocal scanning microscope.

Laser scanning microscopy has become established as an indispensable tool of biomedical research. However, recent developments of microscopic techniques demand methods that are ever more sensitive and more careful in respect of samples. Here confocal microscopy using a focused single laser beam has a significant disadvantage vis-à-vis other methods. For this reason, so-called multipoint methods, which result in a certain parallelization of the image recording, are becoming more and more important. Besides the parallelization, however, a spatial excitation pattern can also be used such that different color excitations are present in different regions of the sample. Advantageously, the signals which are excited in the sample by the individual laser beams can be detected by means of spatial oversampling.

Besides the point-scanning methods, there are further methods that have been developed recently for high-resolution imaging microscopy (wide-field microscopy). In this regard, for example, the SOFI (Superresolution Optical Fluctuation Imaging) method has become known. In order to be able to use this method broadly on existing dyes, a very fast sensor is required that is able to record data with image rates in the MHz range. Such sensors already exist but have the disadvantage that they have only a relatively limited number of pixels. Advantageously, these sensors can be used in a combination with a confocal microscope. The data resulting from the confocal imaging can thus be combined with the data of the SOFI imaging.

Known confocal systems are comparatively inflexible. In general, only a single confocal volume can be measured. However, there are also systems in which multipoint and line patterns can be measured in a switchable manner. For this purpose, various masks are introduced into the illumination beam path and into the pinhole plane.

Known spinning disk systems do indeed use imaging sensors (generally EMCCDs) for measuring the signals of many confocal volumes. However, these systems have only a very limited flexibility. In this regard, the distance between the spots cannot be changed. Furthermore, in such a system, zooming cannot be carried out in a practical way and there is great limitation with regard to the usable objectives. Moreover, switching to a spectral mode with more than three spectral channels is virtually impossible because these systems are based on normal cameras over which the spot pattern is finally scanned.

Finally, an "array-scanning" system is also known, in which a point pattern is scanned over a sample. In this case, the resulting pattern of the signal radiation is "descanned" again. An optical manipulation is then performed with a stationary beam such that the so-called "reassignment" exhibits the desired effect with regard to resolution, etc. Finally, the optical field thus generated is scanned over the sensor again. In principle, this also yields the advantages of high parallelization, for example high image rate and low photodamage, in combination with the advantages of photon reassignment, such as independence in respect of the pinhole size, working at the resolution limit of the laser scanning microscope. However, these advantages are bought at the expense of an extremely complex optical system with the customary disadvantages with regard to costs, transmission losses, problems in implementability in a device. Finally, once again there is severe limitation with regard to spectral flexibility.

Furthermore, the mechanical scanner in a laser scanning microscope (LSM) can be used to compensate for the limited number of pixels of the sensors mentioned and to scan the object in a mosaic-type manner for this imaging as well. That is important particularly because the sensors available hitherto, for example so-called single photon avalanche photodiode arrays (SPAD arrays), currently still have relatively few pixels. The optical system of the confocal microscope has to be designed for this purpose such that a certain image field can be transmitted from the sample to the sensor.

A generic optical group for detection light is described in DE 10 2014 107 606 A1 and comprises the following components: an input plane for the passage of detection light to be measured, and a detection beam path arranged downstream of the input plane and serving for guiding the detection light into a detection plane. In this case, the detection beam path comprises at least one first beam course having first optical beam guiding means, in particular first lenses and/or mirrors, for guiding the detection light into the detection plane.

In DE 10 2014 107 606 A1, by switching the beam course it is possible to realize various excitation and detection modes using only one sensor. In this case, a functionally integrated laser scanning microscope can be switched between point-like, multipoint-like, line-like and wide-field-like illumination.

An object of the invention can be deemed to be that of specifying an optical group, a method for microscopy and a microscope with which the functionality for multipoint microscopy methods can be increased.

This object is achieved by means of the optical group having the features of claim 1, by means of the method having the features of claim 18 and by means of the microscope having the features of claim 28.

The optical group of the type specified above is developed further according to the invention by virtue of the fact that at least one dispersive device for spatially spectrally splitting the detection light to be measured is present in the first beam course, in that a manipulation device for manipulating the spectrally spatially split detection light is present in the first beam course, and in that the first optical beam guiding means together with the dispersive device and the manipulation device are arranged and configured for generating a spectrally separated and diffraction-limited imaging of the input plane into the detection plane.

In the method for microscopy according to the invention, the optical group according to the invention is used and the following steps are carried out: irradiating a sample in a microscope, in particular a confocal laser scanning microscope, with illumination light in an illumination beam path, collecting detection light to be measured, in particular fluorescent light, which the sample emits on account of being irradiated with the illumination light, guiding the detection light to be measured through the input plane, in particular the input pinhole stop, of the optical group, and measuring the detection light by means of at least one detector arranged in the detection plane of the optical group.

Preferably, in this case, the input plane is situated in a plane that is optically conjugate with respect to the plane in which the sample is arranged.

The microscope according to the invention is in particular a confocal scanning microscope and comprises the following components: an illumination beam path having at least one micro-objective and an optical group according to the invention and at least one detector arranged in the detection plane of the optical group. The microscope according to the invention is suitable in particular for carrying out the method according to the invention. Preferably, in this case, the input plane is situated in a plane that is optically conjugate with respect to the plane in which the sample is arranged.

Preferred configurations of the optical group according to the invention, advantageous variants of the method according to the invention and of the microscope according to the invention are described below, in particular with reference to the dependent claims and the figures.

A central concept of the invention can be considered to be that the detection beam path contains a first beam course for the detection light to be measured, in which the detection light of a plurality of illumination spots can be simultaneously spectrally split and manipulated. The microscopy method of spectrally resolved scanning microscopy is made possible as a result.

For variants of the invention it is important that a second beam course for the detection light to be measured can additionally be selected in the detection beam path. Therefore, with the aid of said second beam course, both scanned wide-field microscopy, which is additionally explained in detail below, and highly parallelized multispot confocal microscopy are possible using one and the same detection apparatus.

The invention thus provides a highly functional detection apparatus which can be used for a plurality of microscopy methods.

The input plane is preferably positioned such that it is situated in a plane that is optically conjugate with respect to the sample plane. An input pinhole stop can preferably be positioned in the input plane, but an input pinhole stop is not absolutely necessary. The input pinhole stop can also be referred to as a pinhole or, in particular, a confocal pinhole. The term detection beam path denotes all the optical components which influence the detection light to be measured from its entrance through the input pinhole stop as far as detection in a first, second or a further detector. The terms first beam course and second beam course denote two different optical courses which can be traversed by the detection light to be measured from its entrance through the input pinhole stop as far as detection in a detector in the detection plane. In this case, the first beam course and the second or a further beam course can be identical, that is to say coincide, on partial sections, in particular downstream of the input pinhole stop and/or upstream of the detector. An illumination spot on the sample or the detector is also referred to as spot or point in the context of this description. These spots or points can be diffraction-limited, in particular.

The term light, in particular illumination light or detection light, is understood to mean electromagnetic radiation which typically is used or occurs in microscopy. The illumination light, which can lie in particular in the infrared, visible or ultraviolet spectral range, is typically provided by lasers. Preferably, the microscope according to the invention is a laser scanning microscope. The terms in the German text "Scannen" ["scanning"] and "Rastern" ["scanning"] are used synonymously in the German text of this description.

Spectral spatial splitting or, synonymously, dispersive splitting is understood to mean, in the context of this description, in particular situations in which different spectral components of a beam are guided in different spatial directions and split in this sense. In specific non-vanishing wavelength intervals and spatial direction intervals, a continuous mapping of a wavelength to a spatial direction is effected in this case. That means that wavelengths that are close to one another are also guided in spatial directions that are close to one another. Wavelengths that are further away from one another are accordingly guided in spatial directions that are further away from one another. Accordingly, dispersive splitting in this sense is different splitting than that which can be achieved by arrangements of a plurality of dielectric beam splitters.

Particularly preferably, in the context of the present invention, diffractive or refractive elements, typically prisms or gratings, are used for the dispersive splitting. In principle, no optical filters are necessary in the arrangement according to the invention. Optionally, however, so-called emission filters can be used upstream of the sensors or upstream of the optical device. By way of example, portions of the excitation light or crosstalk of the individual detection channels can be reduced further as a result. It is of importance for the invention that the actual splitting is effected without filters or, in other words, in a filter-free manner. This has the advantage, firstly, that with regard to the concrete beam guiding, a greater flexibility is achieved in detail by comparison with arrangements having discrete dichroic beam splitters or other filters. In addition, a better spectral edge steepness and stabler implementation by comparison with so-called spectral graduated filters are potentially achieved.

In contrast to DE 10 2014 107 606 A1, in the case of the invention, the pupil and image planes are not exchanged in the event of a change in illumination mode.

In one particularly preferred variant of the optical group according to the invention, the the detection beam path comprises a second beam course having second optical beam guiding means, in particular lenses and/or mirrors, for guiding the detection light into the detection plane. In this case, in that the second optical beam guiding means are arranged and configured for generating a diffraction-limited imaging of the input plane into the detection plane, and a selection device is present for selecting the first beam course or the second beam course for the detection light to be measured.

With this configuration, the invention thus provides a detection apparatus which can be operated in different detection modes depending on the measurement task and the corresponding illumination. In particular, the measurement tasks of confocal multipoint microscopy and of, if appropriate scanning, wide-field measurement can be combined with one another.

The invention thus achieves, in particular, the object of specifying a detection apparatus which makes different imaging methods accessible in a single system, without the detection beam course having to be switched upstream of the pinhole. In comparison with confocal systems from the prior art, a higher flexibility is thus achieved with regard to the detection. It is true that DE 10 2014 107 606 A1 shows how different operating modes can be realized using just a single sensor in a laser scanning system. One disadvantage in that case is that pupil and image planes have to be exchanged.

Preferably, at least one spatially resolving, in particular segmented, detector for measuring the detection light is present in the detection plane. An optical group according to the invention having at least one detector positioned in the detection plane can also be referred to as a detection apparatus.

In principle, the optical group according to the invention can be used without an input stop in the input plane. For the case where the optical group is used for confocal microscopy, an input pinhole stop, in particular a confocal pinhole, for admitting detection light to be measured can be arranged in the input plane.

One major advantage of the invention, moreover, is that a mode that allows a comparatively high degree of parallelization is also possible. Values in the region of approximately 100-fold parallelization are conceivable here. With such a method, even living cells can be examined gently for a longer time because the maximum light power can be significantly reduced, without reducing the image quality for a given image recording rate. It is precisely the maximum power that is crucial, however, for a majority of the photodamaging effects. The total dose evidently has a smaller effect.

The selection device can also be configured, in principle, to be able to select between the first beam course, the second beam course and additionally at least one further beam course.

The selection device can be, in principle, any type of beam deflecting device which is suitable for switching beam paths. In principle, electro-optical components can also be used here. Particularly advantageously, the selection device is an adjustable mirror, which in particular is movable into the detection beam path and movable out of the latter. This variant is structurally simple and operates reliably. By way of example, the mirror can be pivotable and/or displaceable. In further advantageous variants, the polarization of the light can also be utilized in the case of the selection device. By way of example, it is possible to use dichroic mirrors, the reflection and transmission properties of which are sensitively dependent on the wavelength and the polarization of the light.

Preferably, the adjustable mirror can be moved into a collimated part of the detection beam path. What is achieved as a result is that the position of the mirror as such as not critical.

In principle, segmented or pixelated detectors can be used as spatially resolving detectors.

In one particularly preferred exemplary embodiment, the spatially resolving detector and/or the second spatially resolving detector are/is an, in particular coolable, SPAD detector (SPAD=Single Photon Avalanche Photodiode Array), or an arrangement of a plurality of these detectors in a suitable configuration.

These sensors are currently at a threshold for commercial usability in a confocal system. SPAD detectors, which are also referred to as SPAD sensors, have a series of advantages. In this regard, quantum efficiencies of up to more than 80% are achieved at specific wavelengths. The high gain of the individual pixel allows these sensors to be operated in the single photon counting mode. Furthermore, these sensors have the necessary read-out speed to thus achieve the necessary read-out rates in the region of 1 MHz in scanning microscopy. In this case, read-out times can vary from approximately 1000 μs to 10 ns. The necessary dynamic characteristic is given if the portions of the point spread function (PSF) are spread among a corresponding number of pixels. Given a dead time of 50 ns, it is possible to achieve for example counting rates of between 1 and 5 MHz per individual element. If the light of a point spread function is spread among a plurality of pixels, for example 25, then counting rates in the region of 100 MHz are possible, which are entirely sufficient for a practical application in laser scanning microscopy. A further development of electronics will in future allow active "quenching" of the electron avalanche in the sensor with significantly shortened dead times, which will once again increase the maximum counting rate. Furthermore, these sensors have the necessary number of pixels to be able to realize the modes mentioned. In this regard, sensors having approximately 100×100 pixels and also significantly more are already known. The most suitable sensor for the measurement tasks handled here is thus in fact a so-called SPAD array (SPAD=Single Photon Avalanche Photodiode Array). This type of sensor unites all the necessary properties, in particular a pixel structure for the spatially resolving measurement of a light distribution, a high sensitivity (high quantum efficiency or photon detection efficiency) and, finally, the possibility of counting individual photons (photon counting) as a result of sufficiently high gain.

However, further measures should be implemented in order to be able to use this sensor in a system according to the invention. By way of example, such sensors have significantly higher dark noise in comparison with photomultipliers (PMT). In order to counteract this effect, two measures should be implemented. Firstly, it is known that cooling significantly reduces the dark noise (by reducing the temperature by 8 K, the dark noise can be approximately halved). In addition, the sensor should be adaptively switchable in such a way that only the pixels that are actually used for the respective signal generation are actually operated. This necessitates a so-called random access (individual access possibility) with regard to the individual pixels. Depending on the light distribution of the illumination and the sensor mode chosen, a specific detection pattern on the sensor is thus selected.

Besides SPAD array sensors (SPAD=Single Photon Avalanche Photodiode Array), however, other sensors can also be used. By way of example, the spatially resolving detector and/or the second spatially resolving detector can be a semiconductor detector, in particular a CCD or a CMOS detector. In particular, fast cameras can be used.

Particularly preferably, the spatially resolving detector and/or the second spatially resolving detector can be a camera with an upstream image intensifier, in particular an upstream multichannel plate.

If a particularly good sensitivity is demanded, for example for the examination of very low-luminosity objects, the spatially resolving detector and/or the second spatially resolving detector can be formed by a plurality of photomultipliers. In this case, the detection light can be redistributed using non-imaging means. As spatially resolving detectors with which even individual photons can be counted, microchannel plates can also be used.

Furthermore, it is possible to use the optical arrangement with conventional photomultiplier technology by using non-imaging optical elements upstream of the photomultipliers. This may be for example optical fiber bundles (DE 10 2013 015 931 A1).

Finally, further solid-state sensors such as photodiodes, or in particular PIN diodes, or so-called SiPM, SiPMT, MPPC, etc., are also usable as detectors.

Depending on what detector is used, even further methods can be employed besides pure imaging. In this regard, using a SPAD array (SPAD=Single Photon Avalanche Photodiode Array), the lifetime of dyes can also be measured and represented (Fluorescence Lifetime Imaging). Likewise, correlations between signals can be measured and evaluated for the purpose of fluorescence correlation spectroscopy. With the corresponding excitation pattern, a multipoint FCS or a multipoint FLIM measurement can thereby be realized.

If camera-like sensors, for example cameras of the EMCCD, CMOS, sCMOS or CCD type, are used, they can be equipped with a fast image intensifier, e.g. a so-called microchannel plate. Furthermore, spatially resolving detection can likewise be effected using so-called hybrid detectors. These sensors consist of a photocathode and an APD structure. In this case, the electrons ejected from the photocathode by the photoelectric effect are accelerated with a high voltage (approximately 8 kV) and then impinge on a sensitive surface, which functions like an APD. A breakdown and an avalanche effect with such a high gain that single photon measurements are possible take place. Hybrid detectors can also be used in a spatially resolving manner.

Furthermore, light can be redistributed to other detectors using non-imaging elements, such as optical fibers or fiber bundles. This could be photomultipliers, for example. Advantageously, the latter can be equipped with a photocathode comprising GaAsP. In the optical arrangement, variations are permissible to the effect that all spectral components are detected by the imaging sensor.

In a further preferred configuration of the detection apparatus according to the invention, at least one, in particular two-dimensional, multilens array is present, and an adjusting device is present in order to move the multilens array into the detection beam path and out of the latter. With the multilens array introduced into the beam path, this variant enables the utilization of the input pinhole stop by a plurality of beams and thus multispot confocal microscopy. In the case of the multilens array, not necessarily all of the lenses have to be utilized in this case. By way of example, in the case of a two-dimensional multilens array, just a row of lenses can be used.

The apparatus configuration comprising at least one multilens array advantageously enables a development of the method according to the invention that is referred to as spectrally resolved multipoint scanning microscopy. In this case, the sample is scanned simultaneously with a plurality of spots of the illumination light, in particular with spots lying in a line, wherein a multilens array is positioned in the detection beam path downstream of the input pinhole stop and the number of lenses of said multilens array is at least equal to the number of spots of the illumination light with which the sample is scanned. Furthermore, the selection device selects the first beam course for the detection light to be measured, the beams of the detection light that are attributed to the individual spots of the illumination light are spectrally spatially split and the beams thus obtained are manipulated by the manipulation device, in particular in the spectral selection plane, and the manipulated beams are detected.

In this method variant, the spectral distributions of the individual beams of the detection light that are attributed to the individual spots of the illumination light can be manipulated in a targeted manner.

In principle, this spectrally resolved multipoint scanning microscopy can be operated if the adjustable mirror forming the selection device has been introduced into the beam path. That is to say that then in the first beam course the detection light is reflected at least once at the mirror. Particularly preferably, however, the mirror is moved out or removed from the beam path for the selection of the first beam course. That is to say that, in this variant, the light which passes into the detection plane via the first beam course is not reflected at the mirror.

The manipulation of the spectral composition can include any desired alterations, in principle. Particularly preferably, manipulating the beams attributed to the individual spots of the illumination light, for at least one, in particular for all, of the spots, is selecting at least one, in particular a single, spectral component. In coordination with the spectral excitation of the corresponding spot of the illumination light, it is then possible, in a targeted manner, to select for example the emission wavelength or the spectral emission wavelength band of a specific dye or it is possible, in a targeted manner, to select two or even more emission wavelengths or spectral emission wavelength bands.

A dispersive device is considered to be any device with which the desired spectral spatial splitting can be realized. By way of example, diffractive components such as gratings can be used. A detection apparatus in which the dispersive device is a prism is particularly preferred. As a result, compact and light-efficient constructions are possible in which detection light reflected back from the manipulation device, in the first beam course, passes through the dispersive device again in the opposite direction, in particular in such a way that the detection light reflected back has no significant chromatic aberrations after passing through the dispersive device in the opposite order and a diffraction-limited imaging of a pinhole or of a point emitter in a sample is possible.

In the corresponding method, the manipulated beams pass through the dispersive device in the first beam course again in the opposite direction.

In a further preferred embodiment variant of the detection apparatus according to the invention, the manipulation device comprises a spectral selection plane, in which in particular adjustable beam deflection means can be arranged. By deflecting individual spectral components, these components, in a targeted manner, can be forwarded in the direction of the or a detector or be removed from the light to be detected.

Particularly preferably, the spectral selection plane is situated in a plane which is different than the detection plane but is optically conjugate with respect to the detection plane.

Further evaluation possibilities arise if at least one second detector is arranged downstream of the spectral selection plane, for detecting detection light which passes, that is to say is transmitted, through the spectral selection plane. In principle, the detection light can then be evaluated in a spectrally resolved manner specifically for the individual illumination spots.

The spectral selection with the aid of the manipulation device can be carried out in various ways, in principle. It is essential that the desired spectral components are guided to a detector. The manipulation device, in particular the beam deflection means in the spectral selection plane, can be formed by an optomechanical arrangement having mirrors, in particular movable mirrors, or other light directing elements. By way of example, a micromirror array can be used. It can also be advantageous to use a so-called SLM (SLM=Spatial Light Modulator). The latter can be used to influence the desired spectral components in such a way that they are directed to the imaging sensor. In addition, it is possible to use here so-called DMD (Digital Mirror Devices) or else MEMS (MEMS=Micro Electro-Mechanical Systems) with a light guiding function.

One important aspect of the invention is furthermore that the manipulation device and the detection plane are separated from one another in the beam path. The manipulation device and the detection plane are thus spatially and optically separated from one another. However, they can preferably be situated in planes that are optically conjugate with respect to one another.

The positioning of an, in particular two-dimensional, multilens array in the detection beam path additionally makes possible a particularly preferred method variant that is referred to as highly parallelized multipoint scanning microscopy. In this case, the sample is scanned simultaneously with many spots of the illumination light, which are arranged in particular in a two-dimensional pattern, wherein an, in particular two-dimensional, multilens array is positioned in the detection beam path downstream of the input pinhole stop and the number of lenses of said multilens array is at least equal to the number of spots of the illumination light with which the sample is scanned. Furthermore, the selection device selects the second beam course for the detection light to be measured, and the beams of the detection light that are attributed to the individual spots of the illumination light are detected. This method is particularly suitable for sensitive samples that rapidly undergo bleaching.

In the prior art DE 10 2014 107 606 A1, it is true that by switching the beam course, different excitation and detection modes can be realized using just one sensor. However, multipoint illumination/detection with different degrees of parallelization is not possible in that case, in contrast to the present invention.

In principle, the illumination in the microscope connected to the detection apparatus according to the invention has to be adapted to the method respectively used. In preferred variants of the method according to the invention, a diffractive element, in particular an SLM (Spatial Light Modulator) or a Dammann grating, is positioned for illumination in a pupil plane of the illumination beam path. The desired illumination patterns, for example one- or two-dimensional multipoint patterns, or else illumination lines, can thus be generated in a highly defined manner.

Particularly in the case of spectrally resolved multispot confocal microscopy, particularly preferably, an, in particular cooled, SPAD detector (SPAD=Single Photon Avalanche Photodiode Array) is used as spatially resolving detector. The signal-to-noise ratio of the measurement data can be increased in this case if in the case of the SPAD array (SPAD=Single Photon Avalanche Photodiode Array) only those pixels which are used for the signal generation respectively required are operated.

Finally, the optical group according to the invention makes possible a further advantageous method variant for direct imaging, which can be referred to as wide-field microscopy or also as scanned wide-field microscopy. In this case, the sample is irradiated simultaneously with illumination light at least in a field of view region, and the selection device selects the second beam course for the detection light to be measured, wherein the field of view region is imaged onto the spatially resolving detector, and wherein the detection beam path is free of multilens arrays and a detection pinhole stop.

A prerequisite for this method is, moreover, that the optical system can transmit the light for the field of view. Since this transmittable field of view is usually not particularly large for the relevant optical systems of confocal microscopes, a development of this method is preferred in which the field of view region is scanned over the sample. In this context, reference can also be made to increasing the etendue of the confocal microscope for adaptation to the detection apparatus. Overall images of a large sample region can then be obtained, in principle, by combining the individual images respectively obtained for each scanner position.

The microscope according to the invention is preferably a confocal laser scanning microscope. In this case, the scanning system can be a confocal system according to the prior art. In principle, a system in which the sample itself is moved, for example, is also usable.

Figure 2:
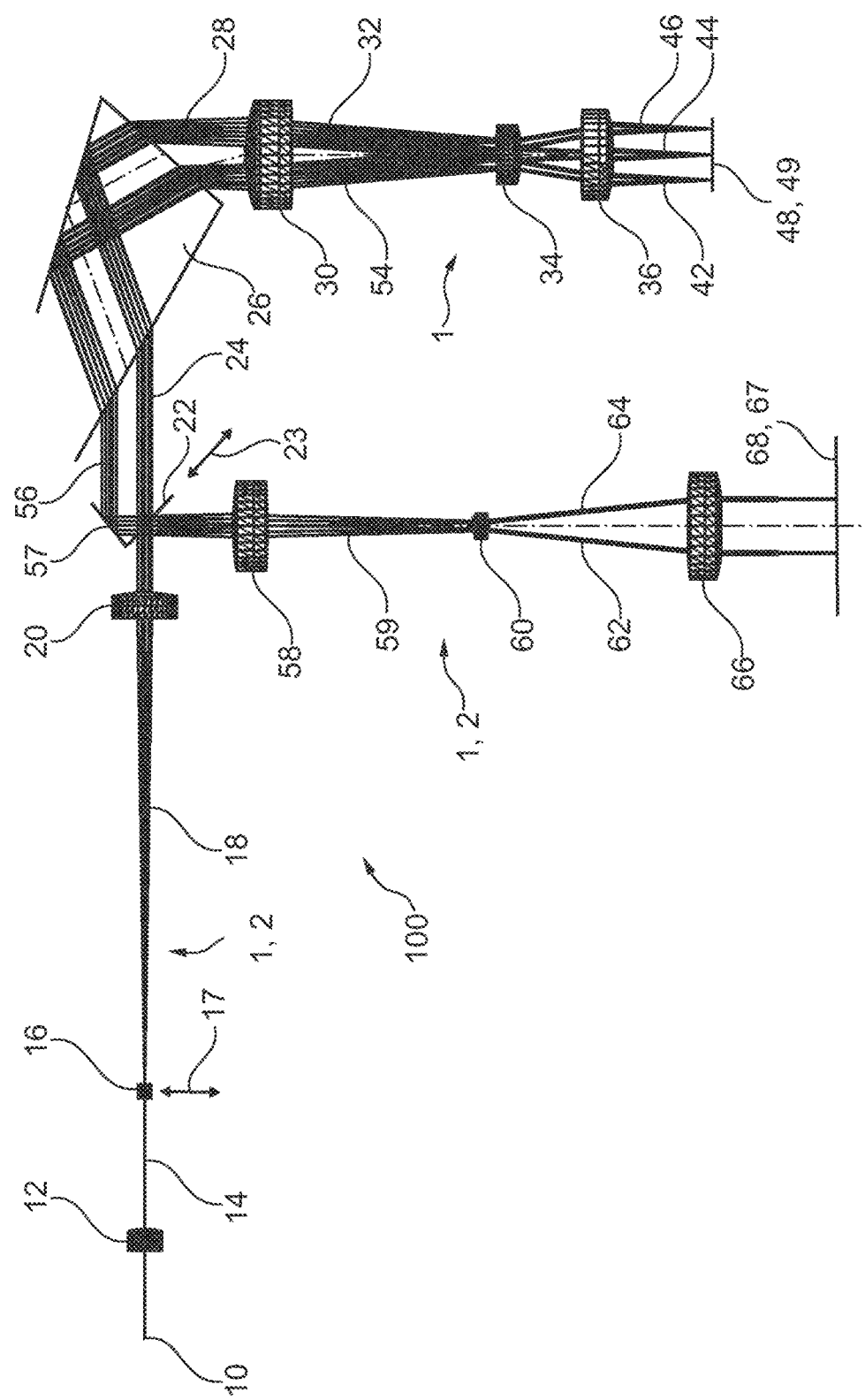
Figure 3:
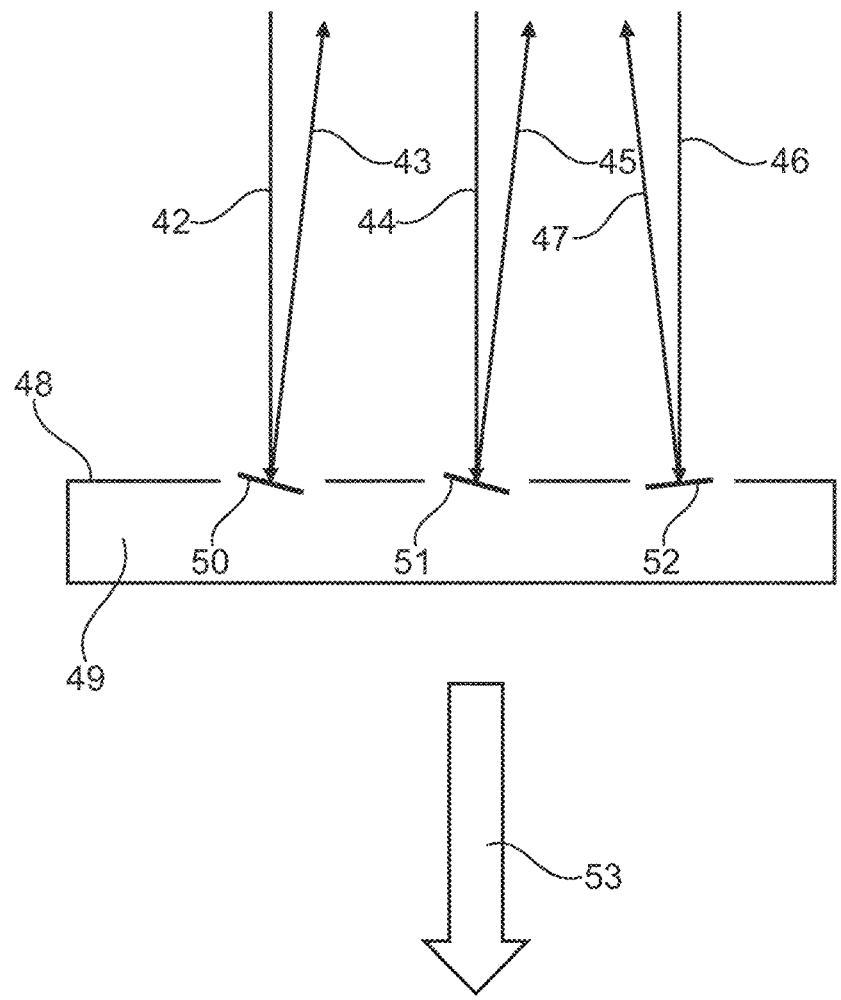
Figure 4:
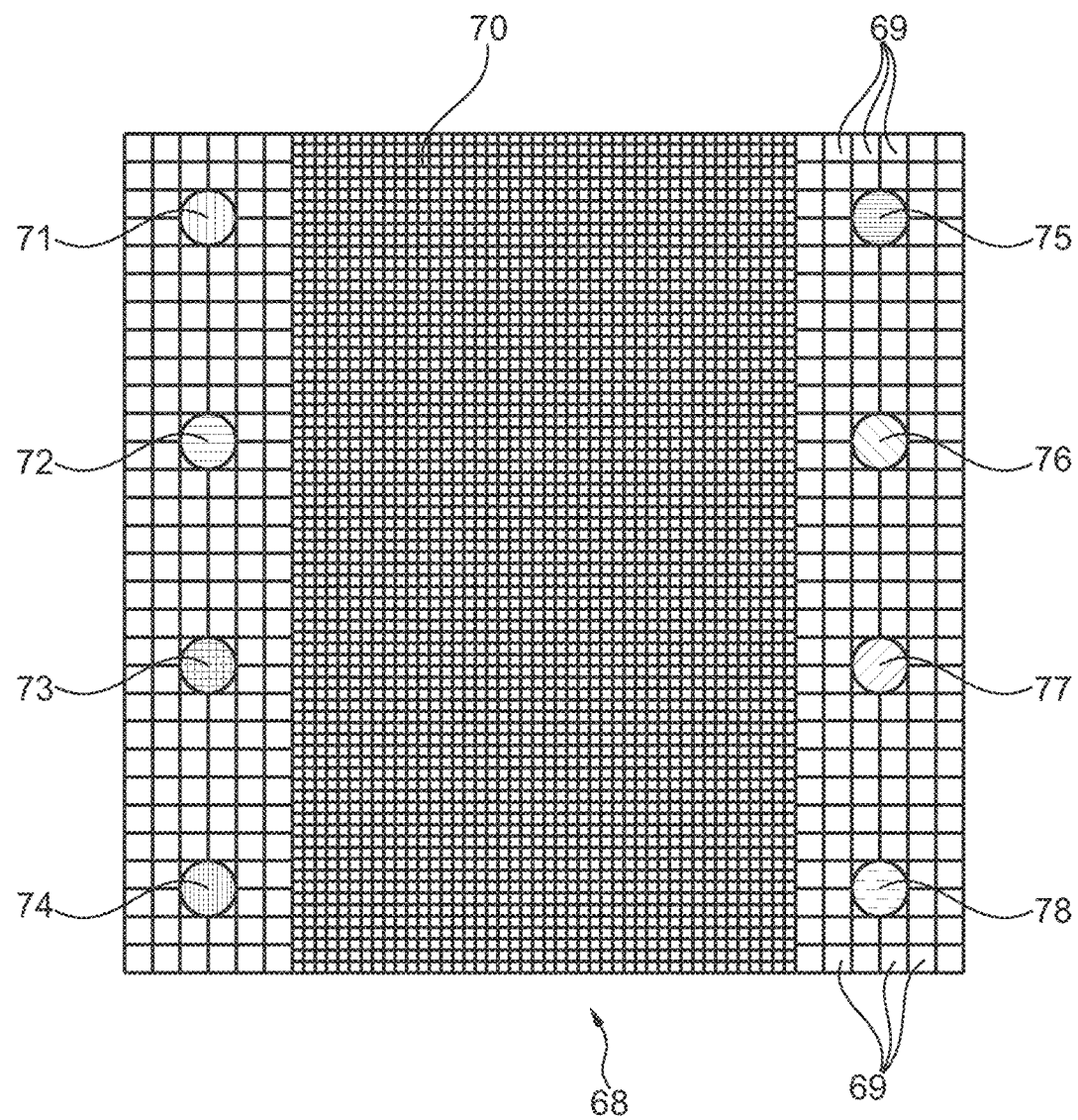
Figure 5:
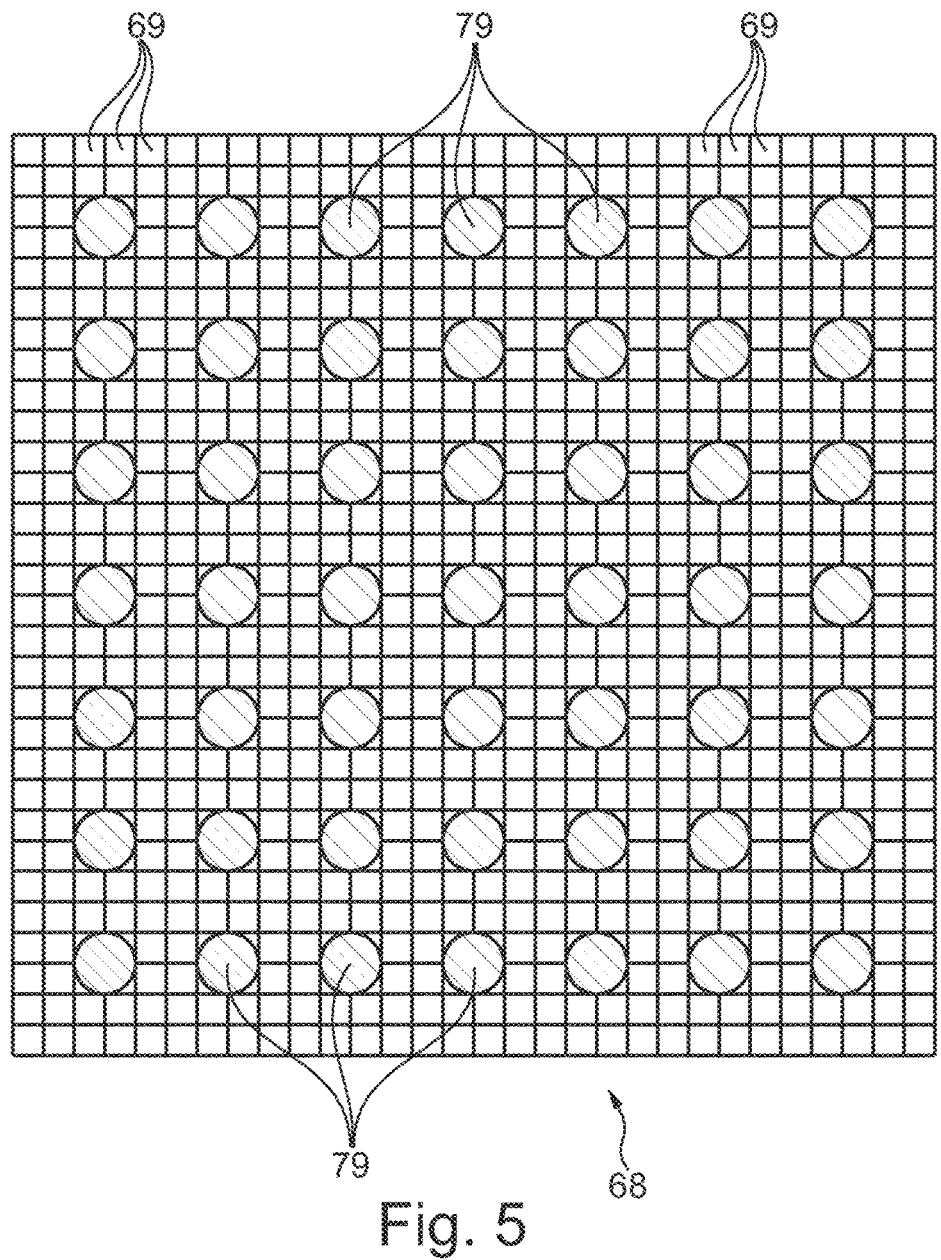
Figure 6:
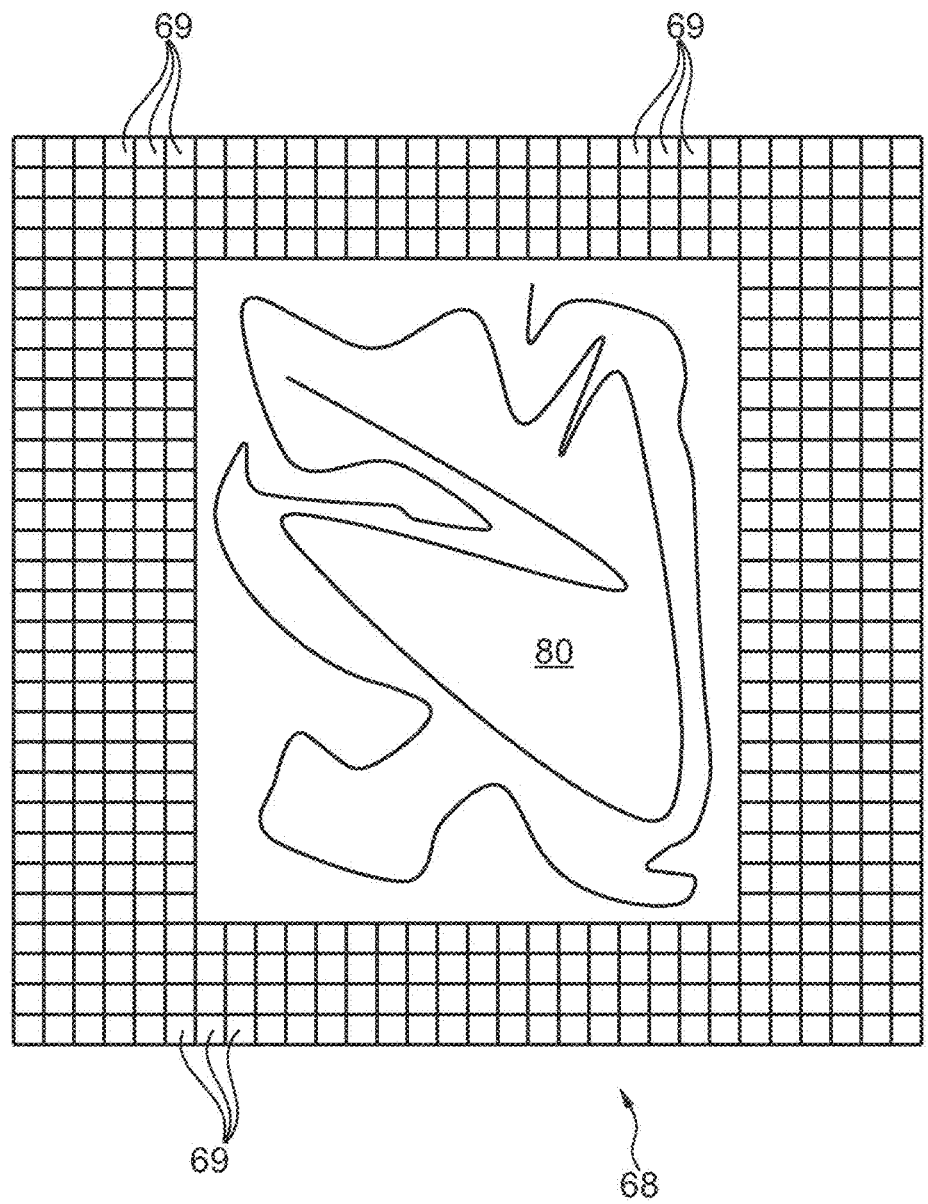

Further advantages and features of the invention are described below with reference to the figures. In the figures:

FIG. 1: shows a perspective and schematic view of a detection apparatus according to the invention;

FIG. 2: shows a plan view of the detection apparatus from FIG. 1;

FIG. 3: shows a detail of the detection apparatus from FIGS. 1 and 2;

FIG. 4: shows a schematic illustration of the spatially resolving detector in a detection apparatus according to the invention for the method variant of spectrally resolved multispot confocal microscopy;

FIG. 5: shows a schematic illustration of the spatially resolving detector in a detection apparatus according to the invention for the method variant of highly parallelized multispot confocal microscopy;

FIG. 6: shows a schematic illustration of the spatially resolving detector in a detection apparatus according to the invention for the method variant of scanned wide-field microscopy.

One exemplary embodiment of a detection apparatus 100 according to the invention for a laser scanning microscope will be explained in detail with reference to FIGS. 1 to 3. Identical and identically acting components are generally identified by the same reference signs in the figures.

The detection apparatus 100 illustrated schematically in FIGS. 1 and 2 comprises, as essential components, an input plane 10, a spatially resolving segmented detector 68 and a detection beam path comprising a first beam course 1 and a second beam course 2. In the first beam course 1, a dispersive device 26 is present and an adjustable mirror 22 serves as a selection device for switching between the first beam course 1 and the second beam course 2. For specific applications, an input pinhole stop 10, which can also be referred to as an input pinhole, can be present in the input plane 10.

The input pinhole stop, which is not illustrated as such in FIGS. 1 and 2, can be situated at the location identified by the reference sign 10. Here lies the input plane 10, which can also be referred to as a plane that is conjugate with respect to the focal plane of the objective. A beam of the detection light 11 to be measured emanates from said input plane 10 and is collimated by a first converging lens 12 and is guided onto an adjustable multilens array 16, which can be removed from the beam path for specific applications with the aid of a mechanism (not illustrated) (double-headed arrow 17). The radiation 18 emanating from the multilens array 16 passes to a second converging lens 20, is collimated by said second converging lens 20 and passes from there onto the adjustable mirror 22, which can be moved out (double-headed arrow 23), for example pulled out or pivoted out, from the beam path with the aid of a mechanism (not illustrated). The adjustable mirror 22 is not illustrated in FIG. 1 for reasons of clarity.

If the mirror 22 that realizes the selection device for selecting the first beam course 1 or the second beam course 2 for the detection light 11 to be measured is situated in the beam path, as illustrated in FIG. 2, the detection light 59, 62, 64 reflected at the mirror 22 passes via the lenses 58, 60, 66 into the detection plane 67 and onto the spatially resolving detector 68. That corresponds to the second beam course 2. The detection light 11 to be measured which enters the input plane 10 is detected with the aid of the spatially resolving detector 68, which is, with regard to the microscope, situated in an intermediate image plane of the micro-objective.

If the adjustable mirror 22 has been removed, for example pulled out or pivoted out (double-headed arrow 23), from the beam path with the aid of the mechanism (not illustrated), the detection light 24 to be measured passes from the lens 20 onto a prism 26, which realizes a dispersive device and serves for spatially spectrally splitting the detection light 24 to be measured. The method variants in which the variable mirror 22 has been pulled out from the beam path relate, in particular, to methods for spectrally resolved confocal multispot scanning microscopy. In this case, a sample is illuminated simultaneously with a plurality of light spots and the radiation emanating from these illuminated sample locations is detected simultaneously. The detection light takes the first beam course in this case.

By way of example, in the case of the situation illustrated in FIG. 2, the detection light 14, 18, 24 to be measured can be split perpendicular to the plane of the drawing, that is to say in the y-direction (see coordinate system 5 in FIG. 1), into a plurality of beams, each associated with different illuminated sample locations. This detection light 24 split in the direction perpendicular to the plane of the drawing enters the prism 26 and is split by the latter in the x-direction (see coordinate system 5 in FIG. 1). Via the lenses 30, 34 and 36, the spatially spectrally split detection light 28, 32 is imaged into a spectral selection plane 48.

A manipulation device 49 for manipulating the spectrally spatially split detection light is situated in the spectral selection plane 48. One example of such a manipulation device 49 is explained further below in association with FIG. 3. With the aid of the manipulation device 49, by way of example, from the spectrally split partial beams, individual spectral components 42, 44, 46 can be guided back and/or suppressed. Thus, individual selected spectral components are reflected back by the manipulation device 49 and then pass back on the same optical course, that is to say via the lenses 36, 34, 30 onto the prism 26. Via the prism 26, the first beam course then continues via a fixed mirror 57 and from there via the lenses 58, 60, 66 into the detection plane 67 and onto the spatially resolving detector 68.

In the case of the optical set-up shown in FIGS. 1 and 2, therefore, the detection light 11 to be measured that comes from the pinhole plane 10 either is guided via an optical apparatus for selecting the spectral components (manipulation device 49) into the detection plane 67 or is imaged directly into the detection plane 67 and onto the spatially resolving detector 68. In this case, spectral components can be selected by the manipulation device 49, which can also be referred to as a spectral selection unit, in the spectral selection plane 48 and can be guided onto the spatially resolving detector 68.

It is of particular importance for the invention that, in both variants, that is to say independently of whether the detection light is guided via the first beam course or the second beam course, the input plane is imaged into the detection plane in a diffraction-limited manner.

In the case where the detection light is guided via the first beam course into the detection plane 67, the diffraction-limited imaging is additionally carried out in a spectrally resolved manner, wherein the spectral resolution and the spectral selection are provided by the respective setting of the spectral manipulation module.

According to the invention, accordingly, the first optical beam guiding means 30, 34, 36, 57 together with the dispersive device 26 and the manipulation device 49 are arranged and configured for generating a spectrally separated and diffraction-limited imaging of the input plane 10 into the detection plane 67.

For the case where the detection light is guided via the second beam course into the detector plane, the second optical beam guiding means 20, 22, 58, 60, 66 are likewise arranged and configured for generating a diffraction-limited imaging of the input plane 10 into the detection plane 67.

Details of a manipulation device 49 are explained with reference to FIG. 3. FIG. 3 schematically shows a manipulation device 49, which is intended to be a micromirror array 49 in the example shown. Said micromirror array 49 comprises a plurality of respectively individually adjustable mirrors, of which three mirrors 50, 51, 52 are illustrated by way of example. Said mirrors 50, 51, 52 are situated in the spectral selection plane 48, which in turn lies in a plane that is conjugate with respect to the object plane of the microscope objective, that is to say in other words in an intermediate image plane. In reality the micromirror array 49 comprises a larger number of micromirrors 50, 51, 52. Once again, however, these mirrors can also be embodied in a macroscopic fashion and be able to be introduced into the beam path in the spectral selection plane in a suitable manner.

In the exemplary embodiment shown in FIG. 3, three beams 42, 44, 46, which were spectrally spatially separated by the prism 26 but originally emanated from one and the same illuminated sample location, impinge on the micromirrors 50, 51 and 52, respectively. The beams 42, 44, 46 are reflected into the beams 43, 45 and 47, respectively. A setting of the mirrors 50, 51, 52 that is chosen in a targeted manner can have the effect, for example, that only specific desired spectral components (e.g. the beams 43, 45, 47 shown) are reflected back on the second beam course, pass into the detection plane 67 and onto the spatially resolving detector 68 and are detected there. In principle, the micromirrors 50, 51, 52 of the micromirror array 49 can also be set such that the incident light is transmitted through the micromirror array 49. Said light, since it has already been spatially spectrally decomposed, downstream of the micromirror array 49, can then either be detected in a spectrally resolved manner or be detected in its spectral entirety by further detectors (not shown in the figures). This light transmitted through the micromirror array 49 is indicated schematically by the arrow 53 in FIG. 3.

FIG. 4 shows an exemplary light distribution on the spatially resolving detector 68 for the case of the microscopy method of spectrally selective confocal detection. It was assumed here that spectral excitation was effected in each case at four different locations in a sample. Afterward, all the emission beams emanating from these excited locations were propagated through the microscope arrangement and through the pinhole plane 10 as far as the spectral selection unit, that is to say the manipulation device 49. There the spectral components of interest are directed back into the plane of the spatially resolving detector 68 as described (FIG. 3) and are detected in a spatially resolved manner there.

In this case, the optical quality of the entire arrangement is so good that a luminous point in the object plane generates a point spread function on the pixelated sensor, that is to say the spatially resolving detector 68, with a diffraction-limited quality, such that the method of "photon reassignment" can be employed. In particular, a chromatic correction has to be implemented in a suitable manner for this purpose. On account of the spectral splitting of the detection light at the prism 26, the individual wavelengths pass from the prism 26 as far as the spectral selection plane 48 on different paths through the optical system. In the spectral selection plane 48, moreover, specific spectral components are reflected at different angles set in a targeted manner, such that they then return once again on different paths through the optical system in order then to be spectrally combined in each case in the prism 26. The different paths through the optical system require a targeted chromatic correction of the optical system mentioned. In this regard, a pure transverse chromatic aberration of the optical system is unimportant, whereas a color-dependent aperture aberration is extremely critical. Generally, the set-up requires a good chromatic correction of all even aberrations, such as focus, aperture aberration and astigmatism, while the odd aberrations, such as distortion and coma, are of secondary importance and compensate for one another in the double passage through the optical system.

In addition, the signal can thus also be deconvolved. The spectral resolution is limited only by the adjustment accuracy of the components of the spectral selection device, that is to say of the manipulation device 49, in relation to the dispersion power of the dispersive element, that is to say of the prism 26 in the exemplary embodiment shown.

In the case of the example shown in FIG. 4, the spatially resolving detector 68 is illustrated schematically with a plurality of pixels 69. By way of example, a cooled SPAD array (SPAD=Single Photon Avalanche Photodiode Array) is involved. In order to minimize noise, advantageously only the pixels in the regions around the indicated light distributions 71 to 78 are used here. In the central region 70, in which no detection light is expected, no bias voltage is applied or at any rate the voltage is below a breakdown threshold, for which reason the entire region 70 does not contribute to the signal, nor to the noise. The signal-to-noise ratio can thus be improved. Specifically, the points 71 and 75 are associated with the varying spectral component of a first sample point. Correspondingly, the points 72 and 76 are associated with a second illuminated sample point, the points 73 and 77 are associated with a third illuminated sample point, and finally the points 74 and 78 are associated with a fourth illuminated sample point. The pixels 69 are illustrated schematically. In reality the pixels can be smaller, such that the light points 71 to 78 overlap a larger number of pixels, for example 9 pixels. Since, in the spectral selection plane 48 with the aid of the manipulation device 49, that is to say in particular of the micromirror array, the back-reflection of the individual spectral components can be set individually for each individual illuminated sample point, the light at each of the points 71 to 78 can have a different wavelength or a different spectral range, wherein the spectral range is defined by its spectral boundary and thus its position in the spectrum and its spectral width. This circumstance is illustrated schematically in FIG. 4 by a respectively different hatching of the points 71 to 78.

In actual fact, with a single point excitation it is possible to detect up to three almost arbitrarily selectable spectral channels using the detection apparatus according to the invention, wherein two of said channels are detectable in a spatially resolved manner (possibility of so-called photon reassignment).

Spatial resolution is understood here not to be the spatial resolution of a sample. Rather, the PSF, that is to say the point spread function, which always lies at the same location, is intended to be spatially oversampled. The PSF in this sense is thus measured in a spatially resolved manner in the detector space.

Upon excitation of the sample with N spectral laser points, 3×N adjustable spectral channels can be detected, wherein 2×N channels can be detected in a spatially resolved manner. Moreover, it is possible to directly record N spectra using a line sensor.

Living cells have a particularly high sensitivity vis-à-vis excessively intense light irradiation. Firstly, the fluorescent dyes are destroyed in the process. This is referred to as photobleaching. Secondly, direct damage to the cells can occur, for example as a result of damage to the DNA as a result of multiphoton processes. These processes generally depend on the light dose to a lesser extent and, rather, on the optical peak power or, equivalently, on the intensity. In other words, the photon flux or the photon density is crucial for these processes. Expedient signal-to-noise ratios (SNR) have a lower limit in biological imaging. On the other hand, in general the image recording rate is intended to attain a certain value. In order to attain a specific signal-to-noise ratio for a given sample and a given image recording rate, the laser power of the excitation radiation is therefore generally increased. This can be problematic in the case of living cells, however, for the abovementioned reasons of sample damage. In these cases, it should be possible to switch the microscope to a mode that is particularly careful in respect of samples. If there is no desire to relinquish the advantages of laser scanning microscopy, which consist in high-resolution imaging with the possibility of optical sections (optical "sectioning"), then the only remaining possibility is to parallelize the recording to the greatest possible extent. The present invention accomplishes this.

In this case, the switching element in the detection apparatus, that is to say the adjustable mirror 22, is once again set to the second beam course 2, that is to say moved into the beam path (double-headed arrow 23). Moreover, the microlens array 16 is introduced into the beam path (double-headed arrow 17). In this case, for spectrally resolved confocal multipoint microscopy, in which the first beam course 1 via the spectral selection plane 48 was used, it is possible to use the same multilens array 16 as for highly parallelized scanning microscopy, which will now be described. All that is important is that the number of microlenses of the multilens array 16 corresponds to the maximum number of focal points (measurement spots) to be measured. Moreover, the multilens array 16 defines the distance between the focal points, which is also referred to as "pitch". This is done in a manner coordinated with the multibeam illumination.

FIG. 5 schematically illustrates a detection situation for the highly parallelized multipoint scanning microscopy. In this case, a multiplicity of light spots 79 are incident on the spatially resolving detector 68, said light spots each being associated with a different illuminated location in the sample. In contrast to spectrally resolved multipoint scanning microscopy, in which the second beam course via the spectral selection plane 48 was used, the light spots 59 generally do not have a spectral profile set in a targeted manner. Rather, the spectral composition of the light spots 49 results from the respective spectral response of the respectively illuminated sample spot to the incident light. Here, too, the pixels 69 are illustrated schematically and in reality the pixels can be smaller, such that the light points 79 overlap a larger number of pixels, for example 9 pixels.

Of course, for every application it is necessary to radiate an excitation field having the corresponding geometry into the sample. By way of example, in the case of highly parallelized multispot scanning microscopy, a suitable illumination pattern having the correct distance between the individual focal points has to be radiated onto the sample. This can be carried out in various ways, in principle. Firstly, a direct illumination of the microscope with a multipoint pattern can be carried out. Furthermore, it is possible, in a stationary pupil, which can be situated on the laser scanning microscope for example between the main color splitter and the scanning objective, to switch the corresponding patterns by means of a spatial light modulator (SLM). By way of example, a so-called Dammann grating can also be used.

In addition, it is also possible to excite different wavelengths in respectively different regions of the highly parallelized multiconfocal laser scanning microscope and to detect the emission respectively excited in these regions.

Besides linear fluorescence excitation, multiphoton excitations of fluorescence are also possible in the case of the method variants described previously.

Finally, the apparatus 100 according to the invention can also be used for direct imaging. This is explained in association with FIG. 6. FIG. 6 schematically illustrates an imaging of a cell formation 80 onto the pixels 69 of the spatially resolving detector 68. In this case, all of the sensor pixels 69 are active. In order to extend the field of view, a different region of the sample can be represented by means of the mechanical scanner of the microscope. For direct imaging, the microlens arrays 16 upstream and downstream of the pinhole in the input plane 10 have to be moved out of the beam path (double-headed arrow 17) and the pinhole itself has to be brought up to the size of the directly imaged field. In this case, the variable mirror 22 is set (double-headed arrow 23) such that the light is guided onto the spatially resolving detector 68 via the second beam course 2 rather than via the spectral selection plane 48. In this case, an inherent symmetry of the arrangement is utilized, which resides in the fact that the position of the variable mirror 22 for the light returning from the manipulation device 49 in the spectral selection plane 48, on the one hand, and for the light coming from the pinhole plane 10, on the other hand, is equivalent. Introducing the variable mirror 22 into the beam path in such a way that the light is not guided via the spectral selection plane 48 but rather, coming from the pinhole plane 10, is directed directly onto the spatially resolving detector 68 has the effect that the pinhole plane 10 is imaged onto the spatially resolving detector 68. However, since the pinhole 10 is itself situated in a conjugate plane with respect to the sample, a direct imaging of the sample is thus provided. That makes it possible, then, to realize all possible wide-field detection methods elegantly using the detection device according to the invention. In this case, FIG. 6 shows a simple imaging of the intensity distribution. In this case, the sample has to be illuminated with a corresponding larger field, of course, which can be realized by means of conventional wide-field illumination. What is better, however, is an illumination distribution which corresponds to the imaged field as accurately as possible and is correspondingly scanned over the sample. For this purpose, in principle, it is merely necessary for a corresponding light field to be radiated onto the sample via the main color splitter and the scanner and to be scanned over said sample.

The illumination of the sample thus has to be adapted to the microscopy method respectively used. In this regard, for the confocal operating mode, the laser beam is focused into the sample and this focus is scanned over the sample. For the wide-field-like detection, it is necessary to carry out a corresponding excitation on a small field in the sample. In this case, the illuminated field should correspond to the size of the area imaged onto the sensor. In order to scan a larger image, the small image field has to be moved over the sample by means of the mechanical scanner. For this purpose, the optical system of the laser-scanning system has to be designed such that it can transport/propagate a certain image field. That means optically that the system must have a certain etendue.

Besides a simple imaging of the intensity, it is also possible to realize further methods based for example on structured illumination (SIM, Structured Illumination Microscopy). On the detection side that functions in exactly the same way as just described with reference to FIG. 6. The difference consists merely in a different illumination. In the case of direct imaging, further parameters can also be measured besides the representation of the spatially resolved intensity. By way of example, with SPAD array sensors (SPAD=Single Photon Avalanche Photodiode Array), owing to the very high read-out speeds, fluorescence lifetimes can also be measured. A significant increase in the speed of the microscopy method known as FLIM (Fluorescence Lifetime Imaging Microscopy) is thus achieved. Furthermore, by way of example, the correlation of the molecular emissions can be used for increasing the optical resolution. This is achieved by means of the so-called SOFI method, for example.

The present invention thus provides a novel optical group which can be used in a multiplicity of microscopic methods. In contrast to a confocal microscope according to the prior art, a certain image field can now be recorded as well. In this case, the detection apparatus can be used both for a detection according to the standard method of confocal microscopy with the aid of the advantageous spatial oversampling and for a wide-field-like detection, on the other hand. As a result, it is possible to record confocal images with a plurality of spectral channels. In a further application, an extremely parallelized recording of a multipoint field for particularly careful microscopy of living samples is additionally possible. Finally, the two-dimensional character of the sensor can be fully utilized by recording a small wide-field image which is scanned over the sample. In this case, in interaction with the illumination, various wide-field-like methods are implementable.

The present invention thus proposes an optical arrangement which allows simple switching of the beam courses in such a way that it is possible to switch between a multiconfocal mode of operation with medium parallelization with adjustable spectral signatures and a multiconfocal mode of operation with a relatively high degree of parallelization and just one sensor. Moreover, by withdrawing, that is to say removing, segmented optical systems (multi- or microlens arrays) from the detection beam path, a wide-field detection is also possible. In the detection beam path, for switching between these two modes, only a maximum of two selection elements are switched, preferably a mirror in the detection unit and, if appropriate, a multi- or microlens array, downstream of the pinhole plane.

For switching spectrally resolved multiconfocal microscopy with medium parallelization to highly parallelized microscopy, in a simple case, only one mirror has to be switched.

The detection apparatus according to the invention thus allows confocal multipoint scanning with or without photon reassignment, highly parallel multipoint scanning and direct imaging.

LIST OF REFERENCE SIGNS

1 First beam course
2 Second beam course

5 Coordinate system
10 Plane of the pinhole stop (pinhole plane), input pinhole stop
12 First converging lens
14 Detection beam downstream of first converging lens
16 Adjustable multilens array
17 Double-headed arrow: movement of the adjustable multilens array
18 Detection beam downstream of multilens array
20 Second converging lens
22 Adjustable mirror
23 Double-headed arrow: movement of the adjustable mirror
24 Detection beam downstream of second converging lens
26 Prism
28 Detection beam downstream of prism
30 Third converging lens
32 Detection beam downstream of third converging lens
34 First diverging lens
36 Fourth converging lens 42, 44, 46
Spectrally split partial beams downstream of fourth converging lens 43, 45, 47
Partial beams 42, 44, 46 reflected from the micromirror array 49
48 Spectral selection plane
49 Micromirror array in spectral selection plane
50, 51, 52 Micromirrors of the micromirror array 49
53 Arrow: detection light passing through the spectral selection plane
54 Detection light reflected back from the spectral selection plane
56 Detection light after renewed passage through prism
57 Mirror (to be fixedly set)
58 Fifth converging lens
59 Detection light downstream of fifth converging lens
60 Second diverging lens
62, 64 Detection light downstream of second diverging lens
66 Sixth converging lens
67 Detection plane
68 Spatially resolving detector
69 Pixel of the spatially resolving detector
70 Passively set region of the spatially resolving detector
71-78 Spectrally split light spots of the detection partial beams
79 Light spots in highly parallelized confocal operation
80 Wide-field image
100 Detection apparatus according to the invention

The invention claimed is:

1. An optical group for detection light of a microscope, having a detection beam path and
serving for guiding of detection light to be measured from an input plane into a detection plane which is optically conjugate to the input plane,
wherein the detection beam path comprises at least one first beam course having first optical beam guiding means for imaging the input plane into the detection plane,
wherein at least one dispersive device for spatially spectrally splitting the detection light to be measured is present in the first beam course,
wherein a manipulation device having adjustable light deflection means for selecting at least one spectral component of the spectrally spatially split detection light is present in the first beam course,
wherein the manipulation device is arranged in a spectral selection plane which is optically conjugate to the input plane and the detection plane,
wherein a two dimensionally spatially resolving segmented detector for measuring the detection light is arranged in the detection plane,
wherein detection light selected by the manipulation device can be radiated back in different adjustable angles in such a way that selected detection light travels back in reverse through the dispersive device, and
wherein the first optical beam guiding means together with the dispersive device and the manipulation device are arranged and configured for generating a spectrally spatially separated, spectrally selected and diffraction-limited imaging of the input plane into the detection plane.

2. The optical group as claimed in claim 1,
wherein the detection beam path comprises a second beam course having second optical beam guiding means for guiding the detection light into the detection plane,
wherein the second optical beam guiding means are arranged and configured for generating a diffraction-limited imaging of the input plane into the detection plane, and
wherein a selection device is present for selecting the first beam course or the second beam course for the detection light to be measured.

3. The optical group as claimed in claim 2,
wherein the selection device is an adjustable mirror.

4. The optical group as claimed in claim 3,
wherein the adjustable mirror is movable into and removable from the detection beam path or a collimated part of the detection beam path.

5. The optical group as claimed in claim 1,
wherein an input pinhole stop for admitting detection light to be measured is arranged in the input plane.

6. The optical group as claimed in claim 1,
wherein the manipulation device or the beam deflection means in the spectral selection plane is formed by at least one of a micromirror array, an SLM (Spatial Light Modulator), a DMD (Digital Mirror Device), or a MEMS (Micro Electro-Mechanical Systems).

7. The optical group as claimed in claim 1,
wherein at least one second detector is arranged downstream of the spectral selection plane, for detecting detection light which passes through the spectral selection plane.

8. The optical group as claimed in claim 7,
wherein the second detector is a spatially resolving detector.

9. The optical group as claimed in claim 1,
wherein detection light reflected back from the manipulation device, in the first beam course, passes through the dispersive device again in the opposite direction.

10. The optical group as claimed in claim 1,
wherein at least one of the spatially resolving detector or the second spatially resolving detector is an SPAD detector (SPAD=Single Photon Avalanche Photodiode Array).

11. The optical group as claimed in claim 1,
wherein at least one of the spatially resolving detector or the second spatially resolving detector is a camera with an upstream image intensifier.

12. The optical group as claimed in claim 1,
wherein at least one multilens array is present, and
wherein an adjusting device is present in order to move the multilens array into the detection beam path and out of the latter.

13. The optical group as claimed in claim 12,
wherein the multilens array is a two-dimensional multilens array.

14. A method for microscopy using the optical group as claimed in claim 1,
wherein the following steps are carried out:
irradiating a sample in a microscope with illumination light in an illumination beam path,
collecting detection light to be measured which the sample emits on account of being irradiated with the illumination light,
guiding the detection light to be measured through the input plane of the optical group, and
measuring the detection light by means of the detector arranged in the detection plane of the optical group.

15. The method as claimed in claim 14,
wherein the detection light to be measured is guided through the input pinhole stop of the optical group.

16. The method as claimed in claim 14,
wherein, for spectrally resolved multipoint scanning microscopy,
the sample is scanned simultaneously with a plurality of spots of the illumination light,
wherein a multilens array is positioned in the detection beam path downstream of the input plane and the number of lenses of said multilens array is at least equal to the number of spots of the illumination light with which the sample is scanned,
wherein the selection device selects the first beam course for the detection light to be measured,
wherein the beams of the detection light that are attributed to the individual spots of the illumination light are spectrally spatially split and the beams thus obtained are manipulated by the manipulation device, and
wherein the manipulated beams are detected.

17. The method as claimed in claim 16,
wherein the sample is scanned simultaneously with a plurality of spots of the illumination light, wherein the spots are lying in a line.

18. The method as claimed in claim 16,
wherein the spectrally spatially split beams are manipulated by the manipulation device in the spectral selection plane.

19. The method as claimed in claim 14,
wherein the detection beam path comprises a second beam course having second optical beam guiding means for guiding the detection light into the detection plane,
wherein the second optical beam guiding means are arranged and configured for generating a diffraction-limited imaging of the input plane into the detection plane,
wherein a selection device is present for selecting the first beam course or the second beam course for the detection light to be measured,
wherein, for direct imaging (wide-field microscopy), the sample is irradiated simultaneously with illumination light at least in a field of view region,
wherein the selection device selects the second beam course for the detection light to be measured, wherein the field of view region is imaged onto the spatially resolving detector, and wherein the detection beam path is free of multilens arrays.

20. The method as claimed in claim 19,
wherein the field of view region is scanned over the sample.

21. The method as claimed in claim 14,
wherein the detection beam path comprises a second beam course having second optical beam guiding means for guiding the detection light into the detection plane,
wherein the second optical beam guiding means are arranged and configured for generating a diffraction-limited imaging of the input plane into the detection plane,
wherein a selection device is present for selecting the first beam course or the second beam course for the detection light to be measured,
wherein, for highly parallelized multipoint scanning microscopy, the sample is scanned simultaneously with a plurality of spots of the illumination light,
wherein a multilens array is positioned in the detection beam path downstream of the input plane and the number of lenses of said multilens array is at least equal to the number of spots of the illumination light with which the sample is scanned,
wherein the selection device selects the second beam course for the detection light to be measured,
wherein the beams of the detection light that are attributed to the individual spots of the illumination light are detected.

22. The method as claimed in claim 21,
wherein a diffractive element is positioned for illumination in a pupil plane of the illumination beam path.

23. The method as claimed in claim 14,
wherein an SPAD detector (SPAD=Single Photon Avalanche Photodiode Array) is used as spatially resolving detector.

24. The method as claimed in claim 23,
wherein in the case of the SPAD array (SPAD=Single Photon Avalanche Photodiode Array) only those pixels which are used for the signal generation respectively required are operated.

25. A microscope, in particular a confocal scanning microscope, having an illumination beam path having at least one micro-objective, an optical group as claimed in claim 1.

26. An optical group for detection light of a microscope,
having an input plane for the passage of detection light to be measured, and
having a detection beam path arranged downstream of the input plane and serving for guiding the detection light into a detection plane,
wherein the detection beam path comprises at least one first beam course having first optical beam guiding means for guiding the detection light into the detection plane,
wherein at least one dispersive device for spatially spectrally splitting the detection light to be measured is present in the first beam course,
wherein a manipulation device for manipulating the spectrally spatially split detection light is present in the first beam course,
wherein the first optical beam guiding means together with the dispersive device and the manipulation device are arranged and configured for generating a spectrally separated and diffraction-limited imaging of the input plane into the detection plane, and
wherein at least one second detector is arranged downstream of the spectral selection plane, for detecting detection light which passes through the spectral selection plane.

27. The optical group as claimed in claim 26, wherein the second detector is a spatially resolving detector.

28. An optical group for detection light of a microscope,
having an input plane for the passage of detection light to be measured, and
having a detection beam path arranged downstream of the input plane and serving for guiding the detection light into a detection plane,
wherein the detection beam path comprises at least one first beam course having first optical beam guiding means for guiding the detection light into the detection plane,
wherein at least one dispersive device for spatially spectrally splitting the detection light to be measured is present in the first beam course,
wherein a manipulation device for manipulating the spectrally spatially split detection light is present in the first beam course,
wherein the first optical beam guiding means together with the dispersive device and the manipulation device are arranged and configured for generating a spectrally separated and diffraction-limited imaging of the input plane into the detection plane,
wherein, for direct imaging (wide-field microscopy), the sample is irradiated simultaneously with illumination light at least in a field of view region, and
wherein the selection device selects the second beam course for the detection light to be measured, wherein the field of view region is imaged onto the spatially resolving detector, and wherein the detection beam path is free of multilens arrays.

29. The method as claimed in claim 28,
wherein the field of view region is scanned over the sample.

* * * * *

UNITED STATES PATENT AND TRADEMARK OFFICE
CERTIFICATE OF CORRECTION

PATENT NO. : 11,221,472 B2  
APPLICATION NO. : 16/342604  
DATED : January 11, 2022  
INVENTOR(S) : Tiemo Anhut, Matthias Wald and Daniel Schwedt Page 1 of 1

It is certified that error appears in the above-identified patent and that said Letters Patent is hereby corrected as shown below:

On the Title Page

Item (72), Inventors, "Daniel Schwedt, Weimar (DE)" should read "Daniel Schwedt, Jena (DE)".

Signed and Sealed this  
Tenth Day of May, 2022

Katherine Kelly Vidal  
*Director of the United States Patent and Trademark Office*